United States Patent
Tsukada et al.

(10) Patent No.: US 10,770,218 B2
(45) Date of Patent: Sep. 8, 2020

(54) REACTOR, MOTOR DRIVER, POWER CONDITIONER AND MACHINE

(71) Applicant: FANUC CORPORATION, Yamanashi (JP)

(72) Inventors: Kenichi Tsukada, Yamanashi (JP); Masatomo Shirouzu, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 60 days.

(21) Appl. No.: 15/890,502

(22) Filed: Feb. 7, 2018

(65) Prior Publication Data
US 2018/0233266 A1 Aug. 16, 2018

(30) Foreign Application Priority Data

Feb. 16, 2017 (JP) ................. 2017-027150

(51) Int. Cl.

| | |
|---|---|
| *H01F 27/10* | (2006.01) |
| *H01F 37/00* | (2006.01) |
| *H02K 11/33* | (2016.01) |
| *H01F 3/14* | (2006.01) |
| *H01F 27/26* | (2006.01) |
| *H01F 27/28* | (2006.01) |
| *H01F 27/30* | (2006.01) |
| *H01F 30/12* | (2006.01) |
| *H01F 30/16* | (2006.01) |
| H01F 27/32 | (2006.01) |

(52) U.S. Cl.
CPC ............. *H01F 27/105* (2013.01); *H01F 3/14* (2013.01); *H01F 27/10* (2013.01); *H01F 27/266* (2013.01); *H01F 27/2852* (2013.01); *H01F 27/306* (2013.01); *H01F 30/12* (2013.01); *H01F 30/16* (2013.01); *H01F 37/00* (2013.01); *H02K 11/33* (2016.01); *H01F 27/263* (2013.01); *H01F 2027/328* (2013.01)

(58) Field of Classification Search
CPC .................................................. H01F 27/0036
USPC ..... 336/65, 83, 170–173, 211–215, 220–223
See application file for complete search history.

(56) References Cited

U.S. PATENT DOCUMENTS

| | | | |
|---|---|---|---|
| 2,406,704 A | | 8/1946 | Mossay et al. |
| 2,702,887 A | * | 2/1955 | Joublanc ................. H01F 30/12 336/5 |
| 4,482,945 A | * | 11/1984 | Wolf ................... H01F 27/2823 336/183 |
| 4,651,266 A | * | 3/1987 | Fujioka ................... H02M 1/14 363/126 |
| 4,912,618 A | | 3/1990 | Krinickas, Jr. |
| 5,202,584 A | | 4/1993 | Burke et al. |
| 10,008,322 B2 | * | 6/2018 | Bhide ..................... H01F 37/00 |

(Continued)

FOREIGN PATENT DOCUMENTS

| | | |
|---|---|---|
| CN | 1073309 A | 6/1993 |
| CN | 201765902 U | 3/2011 |

(Continued)

*Primary Examiner* — Tuyen T Nguyen
(74) *Attorney, Agent, or Firm* — RatnerPrestia

(57) ABSTRACT

A reactor includes an outer peripheral iron core and at least three iron-core coils that contact or are connected to an inner surface of the outer peripheral iron core. Each of the iron-core coils includes iron cores and coils wound onto the iron cores. The reactor further includes an external cooling unit disposed outside the outer peripheral iron core, to cool the outer peripheral iron core.

1 Claim, 14 Drawing Sheets

(56) References Cited

U.S. PATENT DOCUMENTS

| | | | |
|---|---|---|---|
| 10,347,417 B2* | 7/2019 | Tsukada | ................ H01F 27/263 |
| 10,373,753 B2* | 8/2019 | Maeda | ...................... H01F 3/14 |
| 2017/0186530 A1 | 6/2017 | Shiota et al. | |

FOREIGN PATENT DOCUMENTS

| | | |
|---|---|---|
| CN | 102082021 A | 6/2011 |
| CN | 105244137 A | 1/2016 |
| DE | 1085249 B | 7/1960 |
| EP | 3151254 A1 | 4/2017 |
| JP | 5520277 U | 2/1980 |
| JP | 60257503 A | 12/1985 |
| JP | 03502279 A | 5/1991 |
| JP | 0456316 U | 5/1992 |
| JP | 2006114828 A | 4/2006 |
| JP | 2007129817 A | 5/2007 |
| JP | 2009-049082 A | 3/2009 |
| JP | 2010252539 A | 11/2010 |
| JP | 2015032814 A | 2/2015 |
| JP | 2015216209 A | 12/2015 |
| JP | 2015225894 A | 12/2015 |
| WO | 2010119324 A2 | 10/2010 |

* cited by examiner

REACTOR, MOTOR DRIVER, POWER CONDITIONER AND MACHINE

CROSS-REFERENCE TO RELATED APPLICATIONS

This application is a new U.S. Patent Application that claims benefit of Japanese Patent Application No. 2017-027150, filed Feb. 16, 2017, the disclosure of this application is being incorporated herein by reference in its entirety for all purposes.

BACKGROUND OF THE INVENTION

1. Field of the Invention

The present invention relates to a reactor, a motor driver, a power conditioner and a machine.

2. Description of Related Art

In general, reactors have a plurality of iron cores and a plurality of coils wound onto the iron cores. In the reactors, magnetic fluxes leak and pass through the adjoining coils, and thus generate eddy currents in the coils. As a result, the temperature of the coils increases.

Therefore, Japanese Unexamined Patent Publication (Kokai) No. 2009-49082 discloses that "a reactor circulation path 64 is connected to the inside of a reactor case 32 for a reactor 30. The reactor case 32 contains a core 34 and coils 36, which constitute the reactor 30, and a coolant 66 circulates in the remaining space inside the container."

SUMMARY OF THE INVENTION

However, the reactor disclosed in Japanese Unexamined Patent Publication (Kokai) No. 2009-49082 is contained in the reactor case in which the coolant circulates, thus causing an increase in structure size.

Therefore, it is desired to provide a reactor that can be efficiently cooled with a simple structure, and a motor driver, a power conditioner and a machine having such a reactor.

A first aspect of this disclosure provides a reactor that includes an outer peripheral iron core; at least three iron-core coils contacting or connected to an inner surface of the outer peripheral iron core, each of the iron-core coils including iron cores and coils wound onto the iron cores; and an external cooling unit disposed outside the outer peripheral iron core, for cooling the outer peripheral iron core.

According to the first aspect, since the external cooling unit is disposed outside the outer peripheral iron core, the reactor can be efficiently cooled with a simple structure without increasing the size of the reactor.

The above-described and other objects, features and advantages of the present invention will become more apparent from the following description of preferred embodiments of the present invention along with the accompanying drawings.

DETAILED DESCRIPTION

Figure 1:
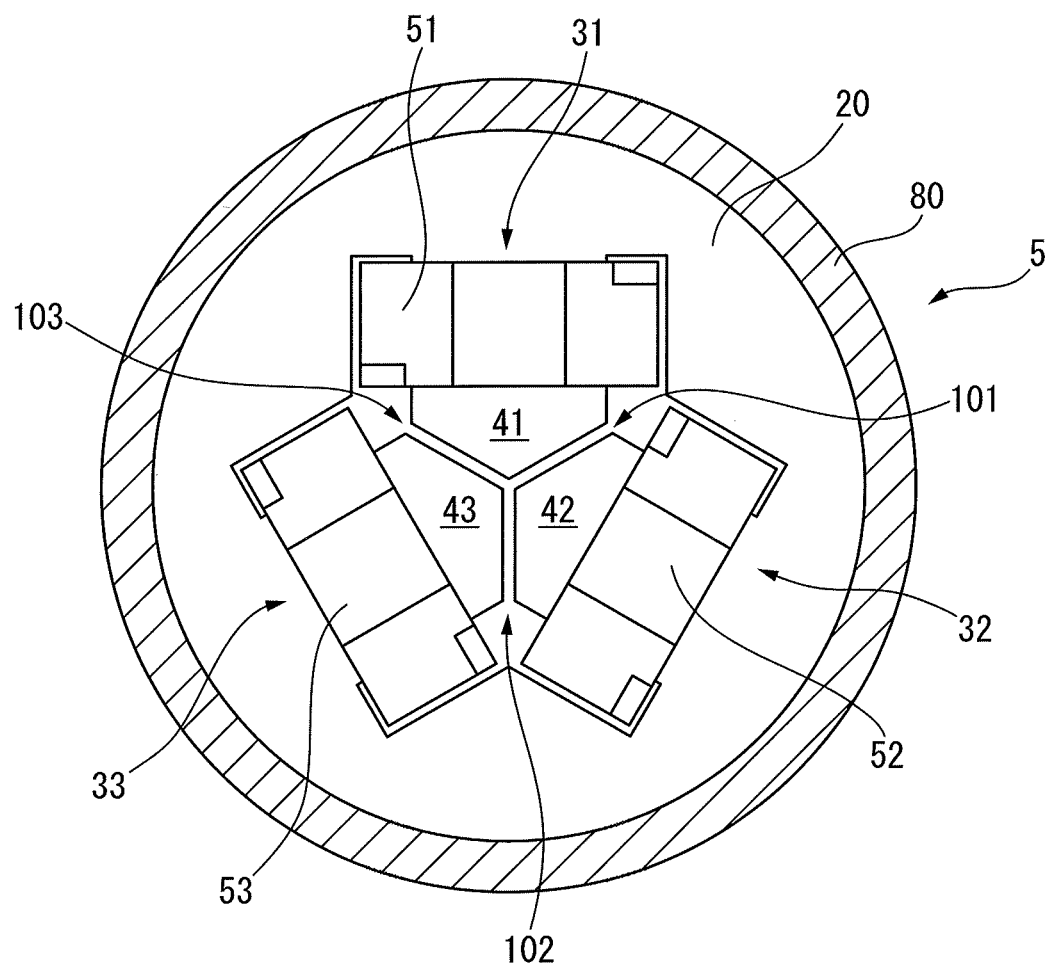
FIG. 1 is an end face view of a reactor according to a first embodiment.

Embodiments of the present invention will be described below with reference to the drawings. In the drawings, the same reference numerals refer to similar components. For ease of understanding, the drawings are scaled appropriately.

FIG. 1 is an end face view of a reactor according to a first embodiment. As shown in FIG. 1, the reactor 5 includes an outer peripheral iron core 20 having a round cross-section and at least three iron-core coils 31 to 33 that contact or are connected to an inner surface of the outer peripheral iron core 20. The number of the iron-core coils is preferably an integral multiple of 3, and the reactor 5 can be thereby used as a three-phase reactor. Note that, the outer peripheral iron core 20 may be polygonal in shape.

The iron-core coils 31 to 33 include iron cores 41 to 43 and coils 51 to 53 wound onto the iron cores 41 to 43, respectively. Note that, the outer peripheral iron core 20 and the iron cores 41 to 43 are each made by stacking a plurality of iron sheets, carbon steel sheets or electromagnetic steel sheets or made of a pressed powder core.

As is apparent from FIG. 1, the iron cores 41 to 43 have approximately the same dimensions as each other, and are arranged at approximately equal intervals in the circumferential direction of the outer peripheral iron core 20. In FIG. 1, each of the iron cores 41 to 43 contacts or is connected to the outer peripheral iron core 20 at its radial outer end portion.

Furthermore, the iron cores 41 to 43 converge toward the center of the outer peripheral iron core 20 at their radial inner end portions each having an edge angle of approximately 120°. The radial inner end portions of the iron cores 41 to 43 are separated from each other by gaps 101 to 103, which can be magnetically coupled.

In other words, in the first embodiment, the radial inner end portion of the iron core 41 is separated from the radial inner end portions of the adjacent two iron cores 42 and 43 by the gaps 101 and 103, respectively. The same goes for the other iron cores 42 and 43. Note that, the gaps 101 to 103 ideally have the same dimensions, but may not have the same dimensions. In embodiments described later, a description regarding the gaps 101 to 103, the iron-core coils 31 to 33 and the like may be omitted.

As described above, in the first embodiment, the iron-core coils 31 to 33 are disposed inside the outer peripheral iron core 20. In other words, the iron-core coils 31 to 33 are enclosed with the outer peripheral iron core 20. The outer peripheral iron core 20 can reduce leakage of magnetic fluxes generated by the coils 51 to 53 to the outside.

Figure 2:
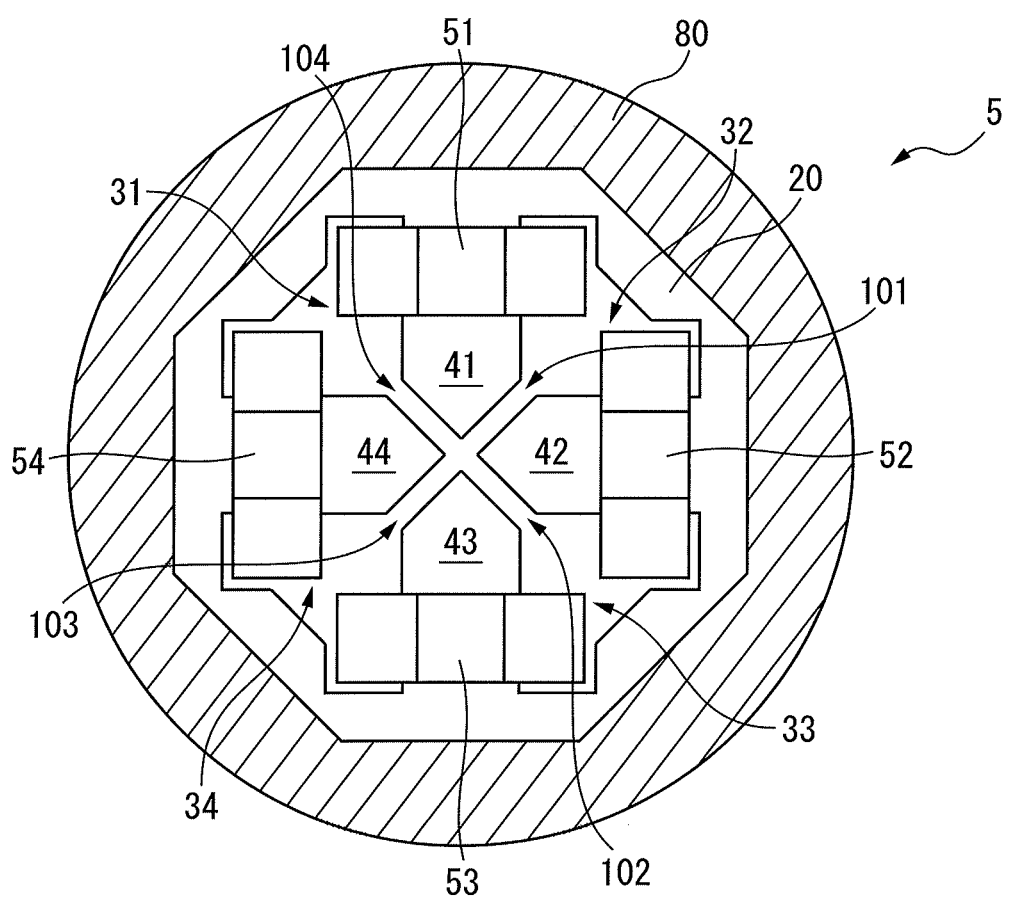
FIG. 2 is an end face view of a reactor according to a second embodiment.

FIG. 2 is an end face view of a reactor according to a second embodiment. A reactor 5 shown in FIG. 2 includes an approximately octagonal outer peripheral iron core 20 and four iron-core coils 31 to 34 that are magnetically connected to the outer peripheral iron core 20. The iron-core coils 31 to 34 are arranged at approximately equal intervals in the circumferential direction of the reactor 5. The number of the iron-core coils is preferably an even number of 4 or more, and the reactor 5 can be thereby used as a single-phase reactor.

As is apparent from the drawing, the iron-core coils 31 to 34 include iron cores 41 to 44 extending in a radial direction and coils 51 to 54 wound onto the iron cores 41 to 44, respectively. Each of the iron cores 41 to 44 contacts the outer peripheral iron core 20 or is formed integrally with the outer peripheral iron core 20 at its radial outer end portion.

Furthermore, a radial inner end portion of each of the iron cores 41 to 44 is disposed in the vicinity of the center of the outer peripheral iron core 20. In FIG. 2, the iron cores 41 to 44 converge at the center of the outer peripheral iron core 20 at their radial inner end portions each having an edge angle of approximately 90°. The radial inner end portions of the iron cores 41 to 44 are separated from each other by gaps 101 to 104, which can be magnetically coupled.

In other words, in the second embodiment, the radial inner end portion of the iron core 41 is separated from the radial inner end portions of the adjacent two iron cores 42 and 44 by the gaps 101 and 104, respectively. The same goes for the other iron cores 42 to 44. Note that, the gaps 101 to 104 have approximately the same dimensions as each other.

Therefore, a single approximately X-shaped gap, which is constituted of the gaps 101 to 104, is formed at the center of the reactor 5. The gaps 101 to 104 are arranged at equal intervals in the circumferential direction of the reactor 5. According to the second embodiment, since the outer peripheral iron core 20 encloses the four iron-core coils 31 to 34, the outer peripheral iron core 20 prevents the leakage of magnetic fields generated by the coils 51 to 54 to the outside.

Furthermore, in the first embodiment shown in FIG. 1 and the second embodiment shown in FIG. 2, an external cooling unit 80 is disposed outside the outer peripheral iron core 20. The external cooling unit 80 cools the inside of the outer peripheral iron core 20, more specifically, cools the coils 51 to 54. Since the external cooling unit 80 is disposed around the outer peripheral iron core 20, the reactor 5 can be efficiently cooled with the simple structure without upsizing, when driving the reactor 5.

Figure 3:
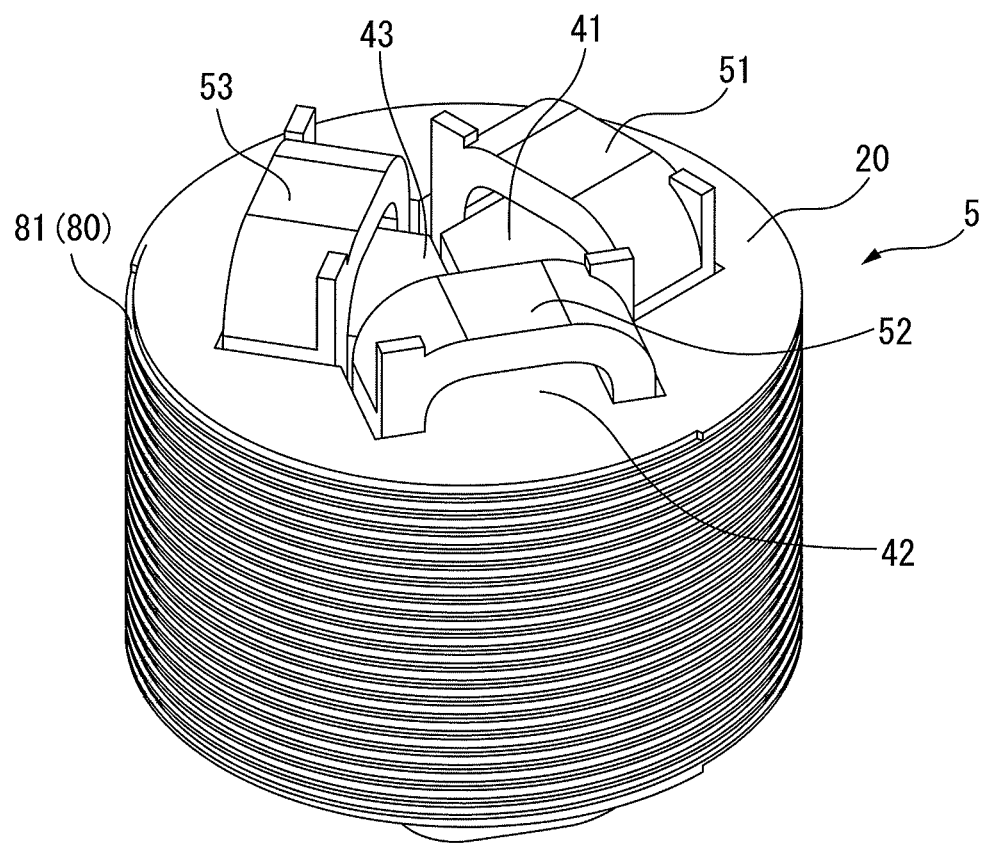
FIG. 3 is a perspective view of a reactor according to a third embodiment.

The external cooling unit 80 of the reactor 5 having the three iron-core coils 31 to 33 will be described below in detail. FIG. 3 is a perspective view of a reactor according to a third embodiment. In FIG. 3, the external cooling unit 80 is constituted of a plurality of fins 81 formed on an outer peripheral surface of an outer peripheral iron core 20. The fins 81 are formed in a circumferential direction on the outer peripheral surface of the outer peripheral iron core 20. However, the fins 81 may be formed in an axial direction on the outer peripheral surface of the outer peripheral iron core 20. Other fins may be formed in the axial direction, as described later. A single helical structure may be formed as the fins. The same is true in other embodiments described later.

In this case, the external cooling unit 80 has an extremely simple structure. Furthermore, since the fins 81, which constitute the external cooling unit 80, are integrated into the outer peripheral iron core 20, another separate member is not required as the external cooling unit 80, thus preventing an increase in the size of the reactor 5.

Figure 4A:
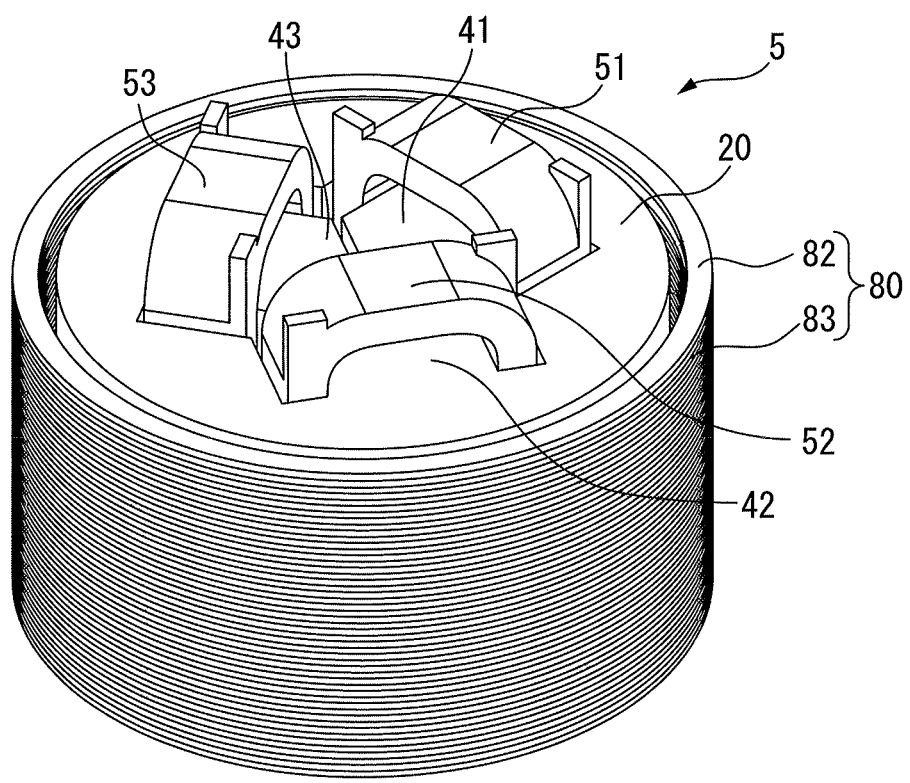
FIG. 4A is a perspective view of a reactor according to a fourth embodiment.

FIG. 4A is a perspective view of a reactor according to a fourth embodiment. In FIG. 4A, an outer peripheral iron core 20 is contained in an approximately cylindrical fin housing 82. The fin housing 82 is preferably formed of the same material as the outer peripheral iron core 20. A plurality of fins 83 extending in a circumferential direction are formed on an outer peripheral surface of the fin housing 82. In the fourth embodiment, the fin housing 82 and the fins 83 constitute an external cooling unit 80. Note that, a space may be or may not be formed between the outer peripheral iron core 20 and the fin housing 82.

Figure 4B:
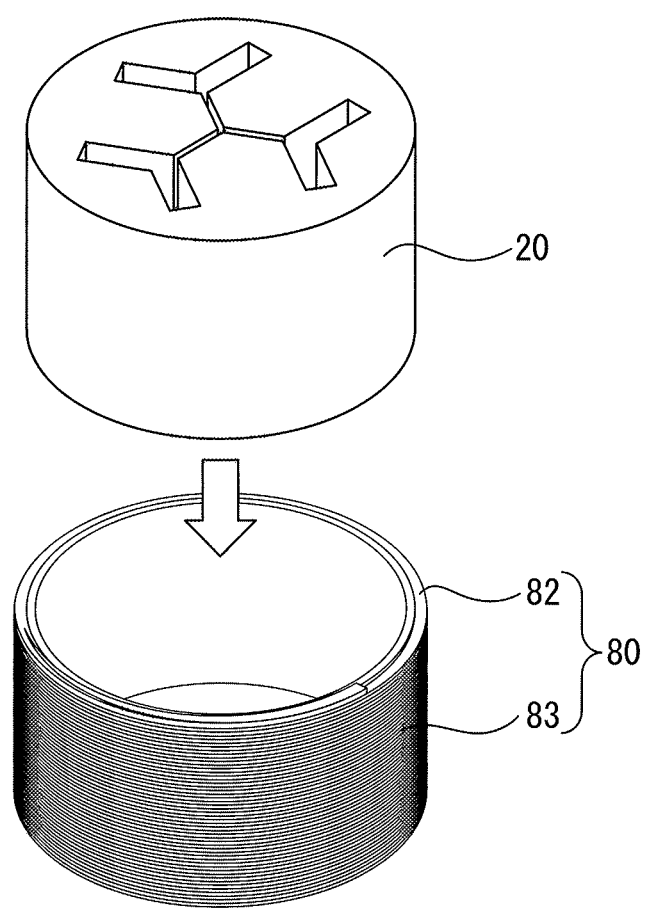
FIG. 4B is an exploded perspective view of the reactor shown in FIG. 4A.

FIG. 4B is an exploded perspective view of the reactor shown in FIG. 4A. For ease of understanding, FIG. 4B and other drawings described later omit coils 51 to 53. As shown in FIG. 4B, in the fourth embodiment, the fin housing 82 having the fins 83 formed thereon is prepared. The outer peripheral iron core 20 having the coils 51 to 53 (not illustrated) is inserted into the fin housing 82. In the fourth embodiment, the external cooling unit 80 can be easily provided for the reactor 5 only by inserting the outer peripheral iron core 20 into the fin housing 82. Note that, a plurality of fins 81 may be formed on an outer peripheral surface of the outer peripheral iron core 20.

Figure 5A:
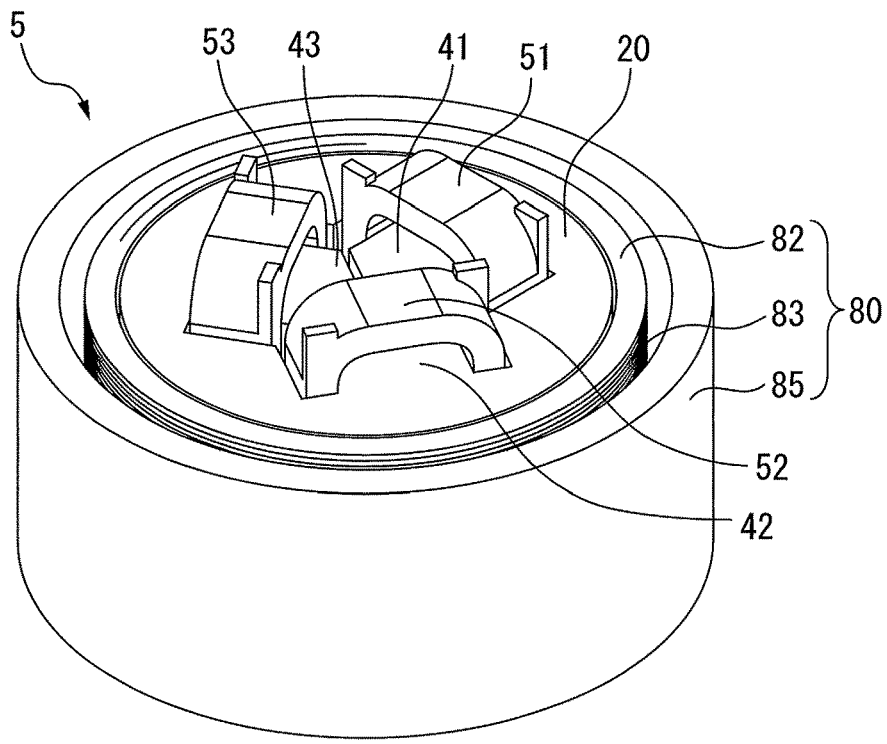
FIG. 5A is a perspective view of a reactor according to a fifth embodiment.

FIG. 5A is a perspective view of a reactor according to a fifth embodiment. In FIG. 5A, a fin housing 82, on which a plurality of fins 83 are formed, is disposed around an outer peripheral iron core 20. The outer peripheral iron core 20 is inserted into a cylindrical jacket 85, which corresponds to an external cooling unit 80. The jacket 85 is preferably made of the same material as the outer peripheral iron core 20. A space is formed between the jacket 85 and the fin housing 82.

In general, end plates are fitted on both end portions of the reactor 5. In the fifth embodiment, the end plates have a sufficient size to close both end portions of the jacket 85. Thus, coolant flows through the space between the jacket 85 and the fin housing 82. This facilitates cooling the reactor 5 more efficiently. Alternatively, the jacket 85 may have a bottom face or both of a bottom face and a top face.

Figure 5B:
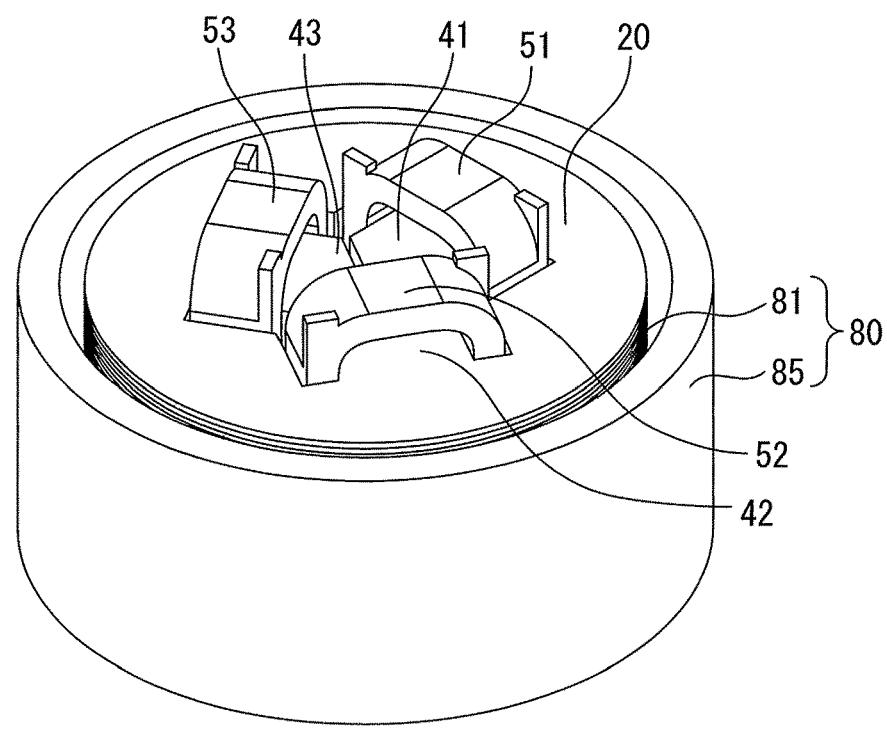
FIG. 5B is a perspective view of another reactor according to the fifth embodiment.

FIG. 5B is a perspective view of another reactor according to the fifth embodiment. In FIG. 5B, an outer peripheral iron core 20 having a plurality of fins 81 formed on its outer peripheral surface is inserted into a jacket 85. A space is formed between the jacket 85 and the outer peripheral iron core 20. In this case, coolant flows through the space between the jacket 85 and the outer peripheral iron core 20, in the same manner as described above, thus cooling the reactor 5 more efficiently.

Figure 6A:
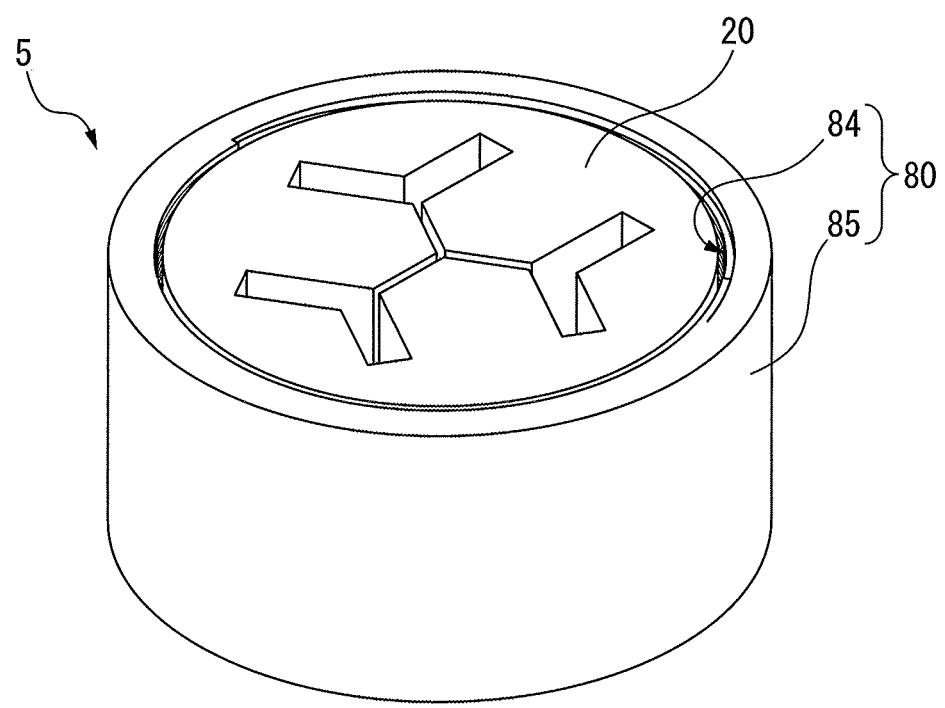
FIG. 6A is a perspective view of a reactor according to a sixth embodiment.
Figure 6B:
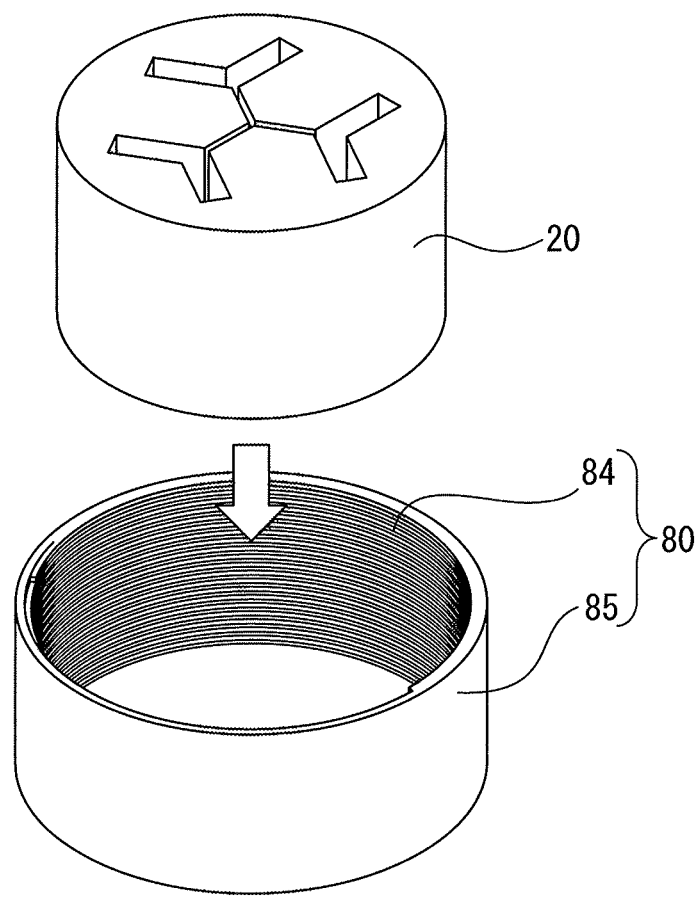
FIG. 6B is an exploded perspective view of the reactor shown in FIG. 6A.

FIG. 6A is a perspective view of a reactor according to a sixth embodiment, and FIG. 6B is an exploded perspective view of the reactor shown in FIG. 6A. In FIG. 6A, an outer peripheral iron core 20 is inserted into a jacket 85, as described above. As shown in FIG. 6B, a plurality of additional fins 84 are formed on an inner peripheral surface of the jacket 85. Thus, the reactor 5 can be cooled more efficiently. Alternatively, a conduit 84 may be formed on the inner peripheral surface of the jacket 85. In this case, coolant flowing through the conduit 84 inside the jacket 85 enhances the cooling effect.

Figure 7A:
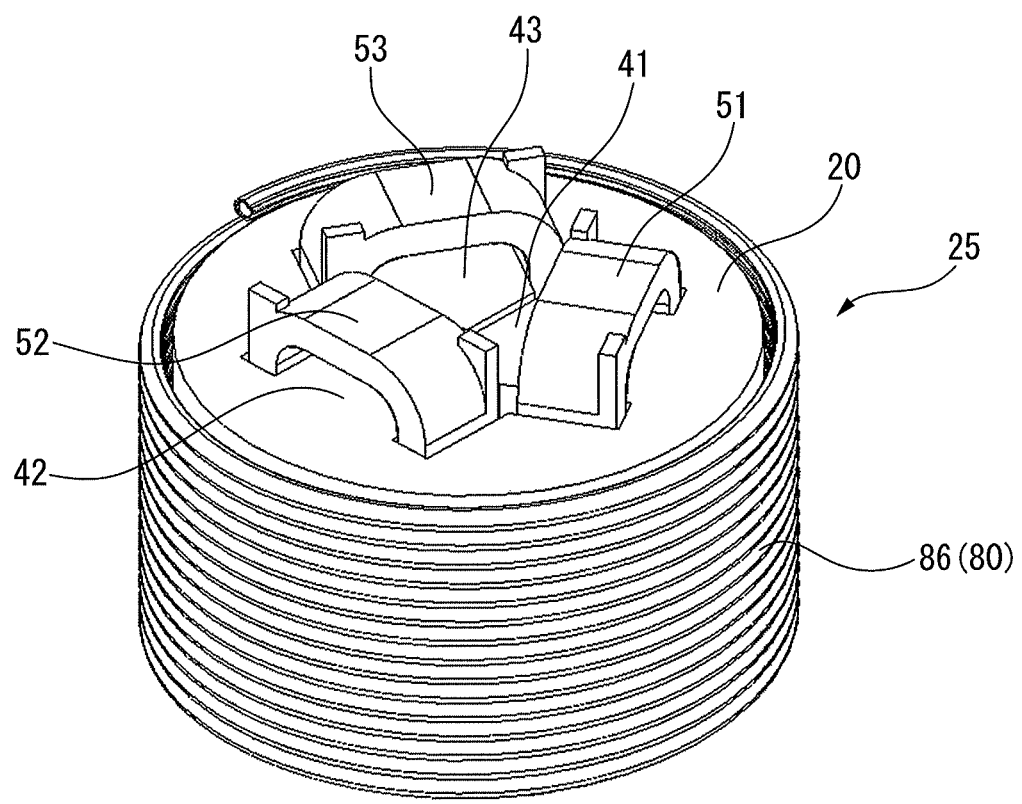
FIG. 7A is a perspective view of a reactor according to a seventh embodiment.
Figure 7B:
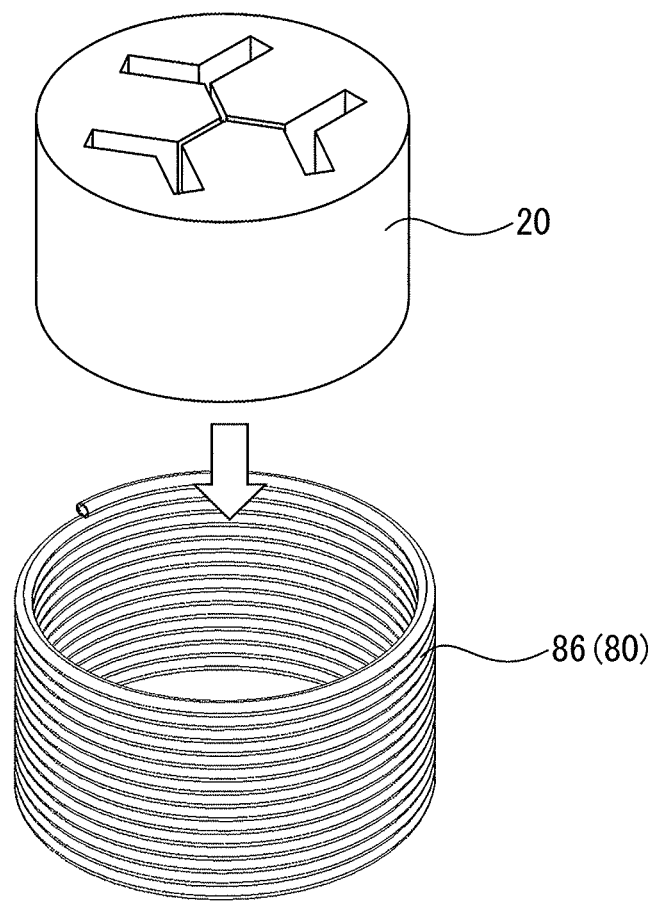
FIG. 7B is an exploded perspective view of the reactor shown in FIG. 7A.

FIG. 7A is a perspective view of a reactor according to a seventh embodiment, and FIG. 7B is an exploded perspective view of the reactor shown in FIG. 7A. As shown in the drawings, an outer peripheral iron core 20 is inserted into a cylinder 86, as described above. The cylinder 86 is made of a wound tube, and has dimensions so as to contain the outer peripheral iron core 20 therein. The tube is preferably made of a material having a higher thermal conductivity than a material for the outer peripheral iron core 20 or is made of a resin. In this case, coolant flowing inside the cylinder 86 cools the reactor 5 more efficiently.

Figure 8A:
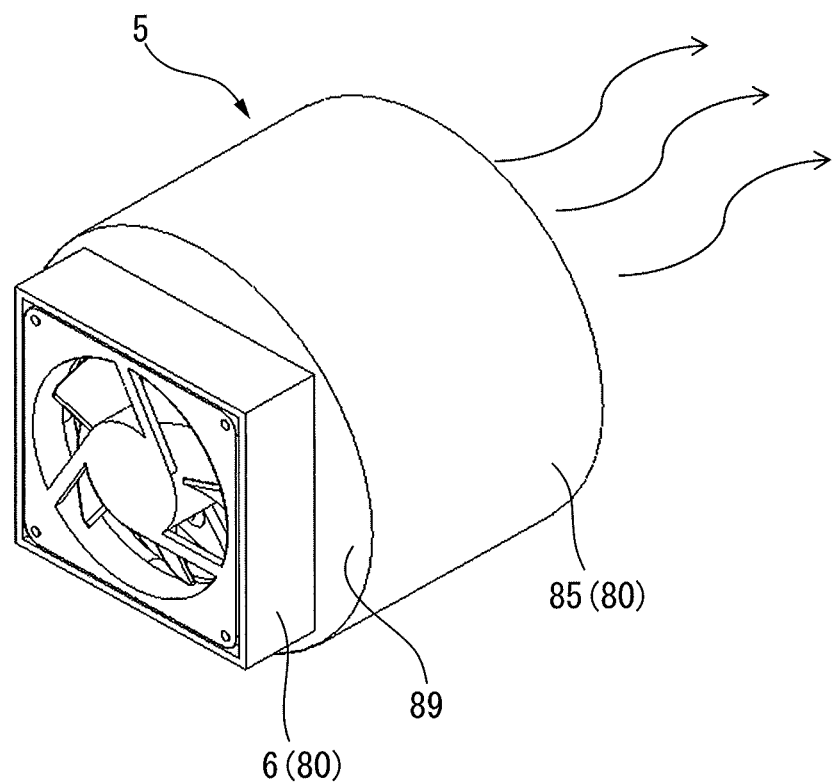
FIG. 8A is a perspective view of a reactor according to an eighth embodiment.
Figure 8B:
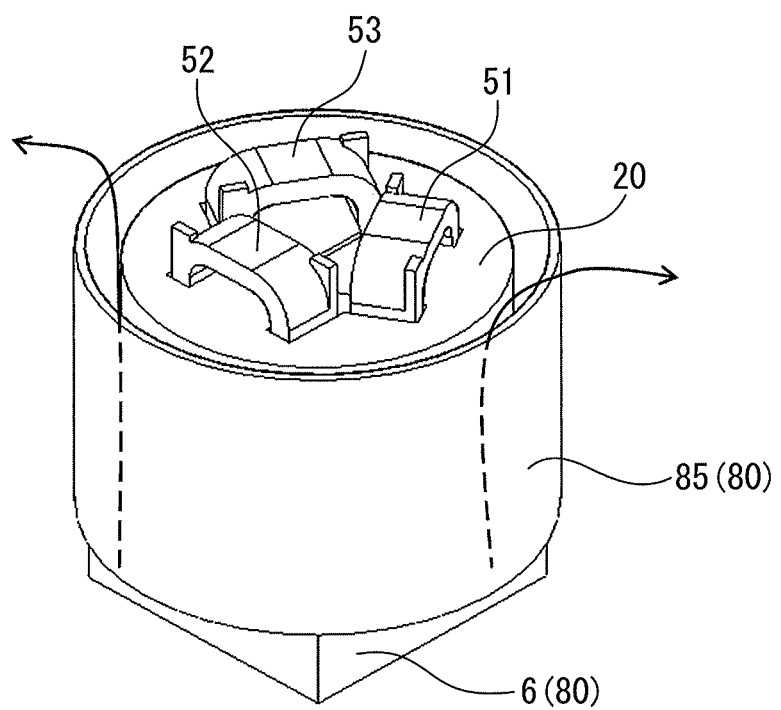
FIG. 8B is another perspective view of the reactor shown in FIG. 8A.

FIG. 8A is a perspective view of a reactor according to an eighth embodiment, and FIG. 8B is another perspective view of the reactor shown in FIG. 8A. In FIG. 8A, the reactor 5 is disposed such that its axial direction coincides with the horizontal direction. In FIG. 8B, the reactor 5 is disposed such that its axial direction coincides with the vertical direction. In the drawings, a cooling fan 6 is attached to a bottom face of a jacket 85. The cooling fan 6 is driven by a non-illustrated motor.

Figure 9A:
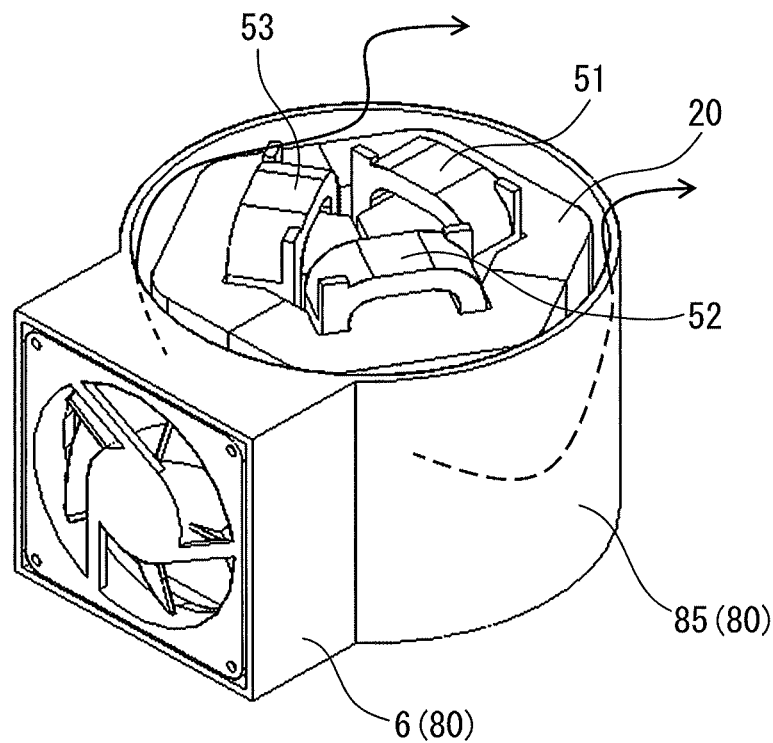
FIG. 9A is a perspective view of a reactor according to a ninth embodiment.
Figure 9B:
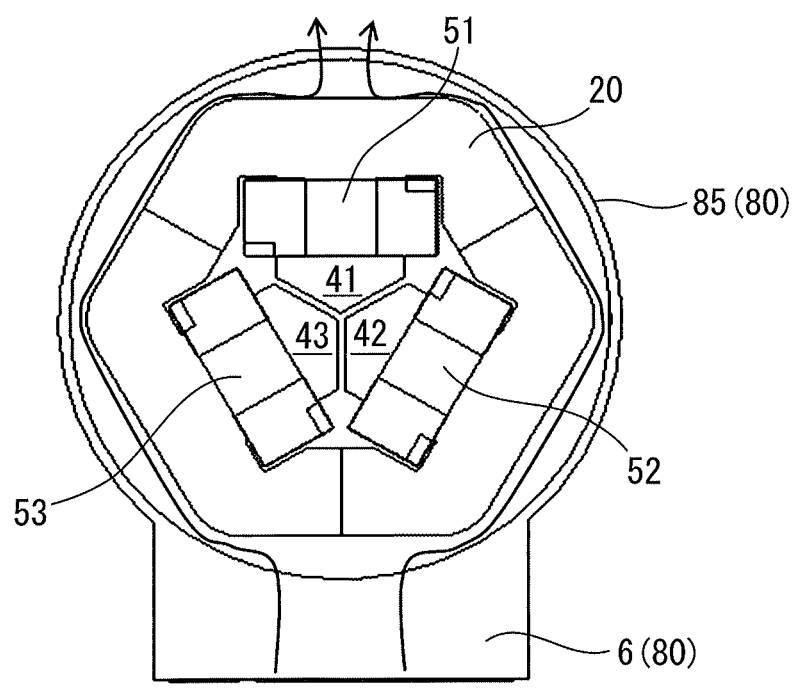
FIG. 9B is another perspective view of the reactor shown in FIG. 9A.

FIG. 9A is a perspective view of a reactor according to a ninth embodiment, and FIG. 9B is another perspective view of the reactor shown in FIG. 9A. In the drawings, a cooling fan 6, which is similar to above, is attached to an outer peripheral surface of a jacket 85.

In the eighth and ninth embodiments, when the cooling fan 6 is driven, air flows from the cooling fan 6 through a space between the outer peripheral iron core 20 and the jacket 85 in the axial direction or a circumferential direction of the reactor 5. Therefore, the cooling effect on the reactor 5 is further enhanced.

Figure 10:
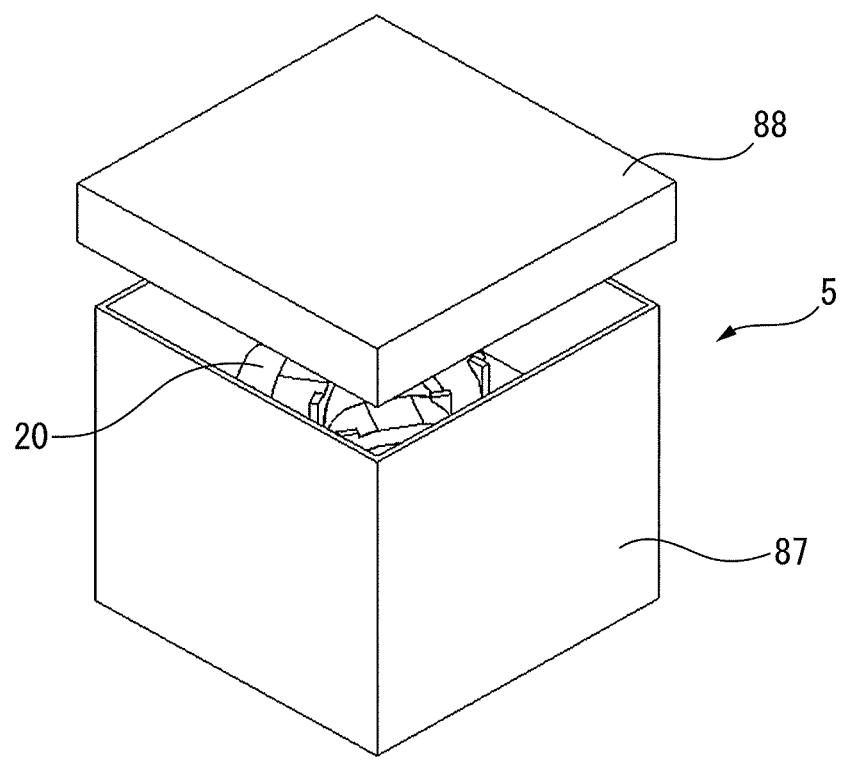
FIG. 10 is a perspective view of a reactor according to a tenth embodiment.

FIG. 10 is a perspective view of a reactor according to a tenth embodiment. In FIG. 10, an external cooling unit 80 includes a housing 87 and a lid 88 for closing the top of the housing 87. The housing 87 contains an outer peripheral iron core 20 having coils 51 to 53. After or before the outer peripheral iron core 20 is contained, a predetermined amount of coolant is injected into the housing 87. After the housing 87 is closed with the lid 88, the reactor 5 is driven. Therefore, the coolant injected into the housing 87 cools the reactor 5 more efficiently.

Figure 11:
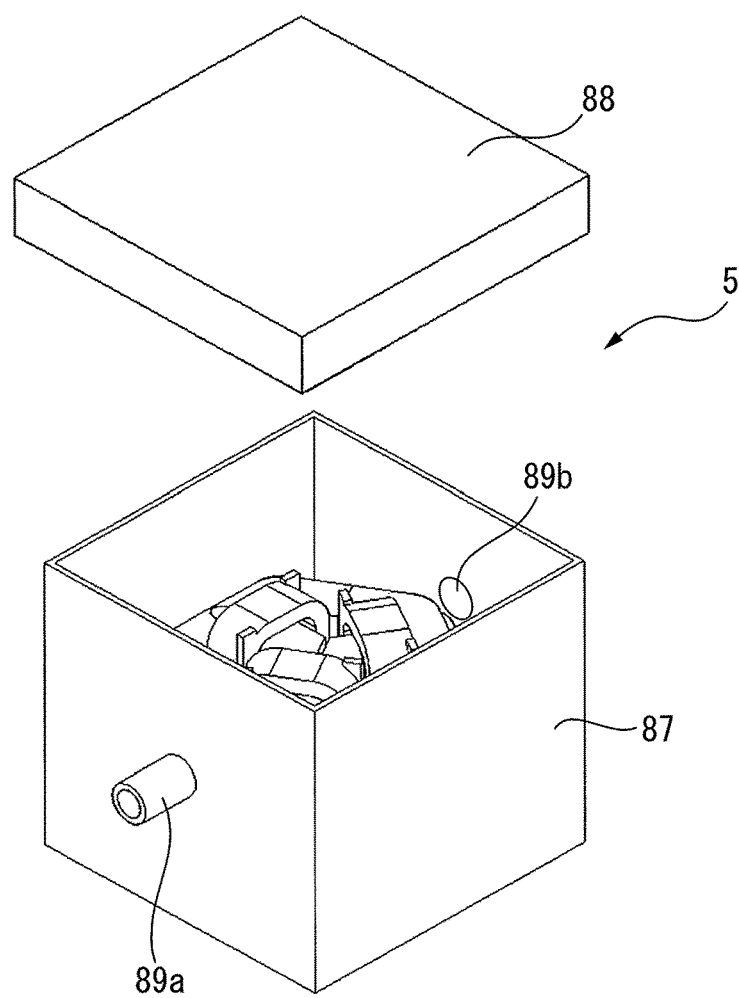
FIG. 11 is a perspective view of a reactor according to an eleventh embodiment.

FIG. 11 is a perspective view of a reactor according to an eleventh embodiment. In FIG. 11, through holes are formed in two opposite faces of a housing 87, and an inlet 89a and an outlet 89b are installed on the through holes. An outer peripheral iron core 20 having coils 51 to 53 is disposed in the housing 87, and the housing 87 is closed with a lid 88. When coolant is supplied from a non-illustrated cooling device into the inlet 89a, the coolant flows inside the housing 87 and is ejected from the outlet 89b. In this case, since the coolant is always supplied in a cooled state, it is possible to prevent an increase in the temperature of the coolant owing to the reactor 5, thus cooling the reactor 5 with extremely high efficiency.

Figure 12:
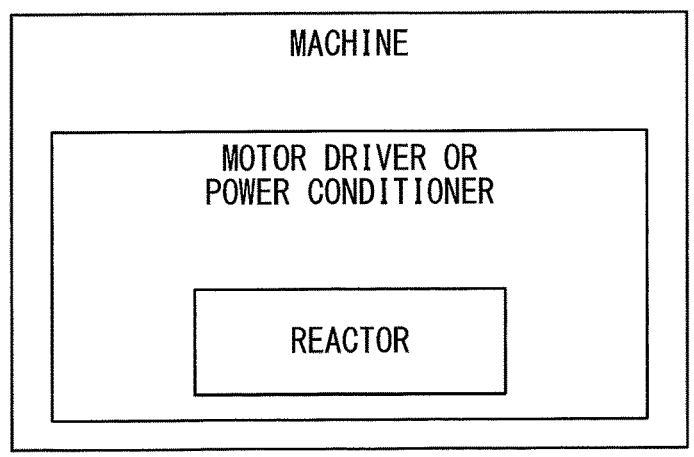
FIG. 12 is a block diagram of a machine having a reactor.

FIG. 12 is a block diagram of a machine having a reactor. In FIG. 12, a reactor 5 is used in a motor driver or a power conditioner. The motor driver or the power conditioner is installed in the machine. In this case, the motor driver, the power conditioner, the machine and the like having the reactor can be easily provided. The scope of the present invention includes combinations of some of the embodiments described above in an appropriate manner.

Aspects of Disclosure

A first aspect provides a reactor (5) that includes an outer peripheral iron core (20); at least three iron-core coils (31-34) contacting or connected to an inner surface of the outer peripheral iron core, each of the iron-core coils including iron cores (41-44) and coils (51-54) wound onto the iron cores; and an external cooling unit (80) disposed outside the outer peripheral iron core, for cooling the outer peripheral iron core.

According to a second aspect, in the first aspect, the external cooling unit includes at least one fin (81) formed on an outer peripheral surface of the outer peripheral iron core.

According to a third aspect, in the first or second aspect, the external cooling unit includes a fin housing for containing the outer peripheral iron core, and at least one fin is formed on an outer peripheral surface of the fin housing.

According to a fourth aspect, in the second or third aspect, the external cooling unit further includes a jacket (85) for enclosing the at least one fin.

According to a fifth aspect, in the fourth aspect, a conduit (84) is formed on an inner peripheral surface of the jacket.

According to a sixth aspect, in any of the first to fifth aspects, the external cooling unit includes a cylinder (86) made from a wound tube disposed around the outer peripheral iron core.

According to a seventh aspect, in the fourth or fifth aspect, the external cooling unit further includes a cooling fan (6) disposed on at least one of an end face of the jacket and an outer peripheral surface of the jacket.

According to an eighth aspect, in any of the first to seventh aspects, the external cooling unit includes a housing (87) for sealing the outer peripheral iron core, and a coolant is injected into the housing.

According to a ninth aspect, in the eighth aspect, an inlet (89a) and an outlet (89b) are formed in the housing, and the coolant flows from the inlet inside the housing to the outlet.

According to a tenth aspect, in any of the first to ninth aspects, the number of the iron-core coils is an integer multiple of 3.

According to an eleventh aspect, in any of the first to ninth aspects, the number of the iron-core coils is an even number of 4 or more.

A twelfth aspect provides a motor driver including the reactor according to any of the first to eleventh aspects.

A thirteenth aspect provides a machine including the motor driver according to the twelfth aspect.

A fourteenth aspect provides a power conditioner including the reactor according to any of the first to eleventh aspects.

A fifteenth aspect provides a machine including the power conditioner according to the fourteenth aspect.

Effects of Aspects

According to the first aspect, since the external cooling unit is disposed outside the outer peripheral iron core, the reactor can be efficiently cooled with a simple structure.

The second aspect extremely simplifies the structure of the external cooling unit, and prevents an increase in the size of the reactor.

According to the third aspect, the external cooling unit can be easily provided for existing reactors, only by inserting the outer peripheral iron core into the fin housing.

According to the fourth aspect, the coolant flowing between the jacket and the fin cools the reactor more efficiently.

According to the fifth aspect, since the at least one fin is formed on the inner peripheral surface of the jacket, the reactor can be cooled more efficiently.

According to the sixth aspect, the external cooling unit can be easily provided for the reactor, only by winding the hollow tube around the outer peripheral iron core.

According to the seventh aspect, air flowing from the cooling fan through the inside or outside of the reactor further enhances the cooling effect.

According to the eighth aspect, the coolant cools the reactor more efficiently.

According to the ninth aspect, the coolant cools the reactor more efficiently.

According to the tenth aspect, the reactor can be used as a three-phase reactor.

According to the eleventh aspect, the reactor can be used as a single-phase reactor.

The twelfth to fifteenth aspects easily provide a motor driver, a power conditioner and a machine having the reactor.

The present invention is described above using the preferred embodiments, but it is apparent for those skilled in the art that the above-described modifications and other various modifications, omissions and additions can be made without departing from the scope of the present invention.

What is claimed is:

1. A reactor comprising:
an outer peripheral iron core;
at least three iron-core coils contacting or connected to an inner surface of the outer peripheral iron core,
wherein each of the iron-core coils includes iron cores and coils wound onto the iron cores, wherein a radial inner end portion of each of the iron cores converges towards a center of the outer peripheral iron core;
gaps that can magnetically connect one iron-core coil of the at least three iron-core coils and an iron-core coil adjacent to the one iron-core coil to each other are formed between the one iron-core coil of the at least three iron-core coils and the iron-core coil adjacent to the one iron-core coil, wherein the radial inner end portion of the iron core of the one iron-core coil is separated from the radial inner end portions of each adjacent iron core by the gaps;
wherein each of the iron cores extends only in a radial direction of the outer peripheral iron core; and
an external cooling unit is disposed circumferentially outside the outer peripheral iron core, for cooling the outer peripheral iron core.

* * * * *